(12) United States Patent
Gallardo et al.

(10) Patent No.: US 7,141,890 B1
(45) Date of Patent: Nov. 28, 2006

(54) AUTOMOBILE ANTI-THEFT DEVICE

(76) Inventors: Jose A. Gallardo, 27910 Oakgale Ave., Canyon Country, CA (US) 91351; Graciela A. Gallardo, 27910 Oakgale Ave., Canyon Country, CA (US) 91351

( * ) Notice: Subject to any disclaimer, the term of this patent is extended or adjusted under 35 U.S.C. 154(b) by 431 days.

(21) Appl. No.: 10/692,593

(22) Filed: Oct. 24, 2003

(51) Int. Cl.
*B60R 25/00* (2006.01)

(52) U.S. Cl. .............. 307/10.3; 307/10.6; 340/5.64; 340/426.11; 340/426.13; 340/426.17; 340/426.19; 180/287

(58) Field of Classification Search ............. 307/9.1, 307/10.2, 10.3, 10.6; 340/5.72, 5.64, 426.13, 340/426.17, 426.18, 426.19, 426.11; 180/287
See application file for complete search history.

(56) References Cited

U.S. PATENT DOCUMENTS

| | | | | |
|---|---|---|---|---|
| 4,452,197 | A * | 6/1984 | Weber | 123/198 B |
| 4,596,218 | A * | 6/1986 | Karau et al. | 123/406.26 |
| 4,601,197 | A * | 7/1986 | Fattic et al. | 73/117.3 |
| 5,119,065 | A * | 6/1992 | Wiehagen | 340/5.3 |
| 5,623,245 | A * | 4/1997 | Gilmore | 340/426.12 |
| 5,808,564 | A * | 9/1998 | Simms et al. | 340/990 |
| 5,811,886 | A * | 9/1998 | Majmudar | 307/10.2 |
| 6,018,292 | A * | 1/2000 | Penny, Jr. | 340/426.29 |
| 6,265,787 | B1 * | 7/2001 | Downey | 307/10.2 |
| 6,311,664 | B1 * | 11/2001 | Jacobs et al. | 123/198 DC |
| 2002/0097152 | A1 * | 7/2002 | Mengrone et al. | 340/571 |

FOREIGN PATENT DOCUMENTS

| | | | |
|---|---|---|---|
| CA | 1158335 A | * | 12/1983 |
| JP | 04011544 A | * | 1/1992 |

* cited by examiner

*Primary Examiner*—Brian Sircus
*Assistant Examiner*—Daniel Cavallari

(57) ABSTRACT

An automobile anti-theft device disrupting normal operation of an automobile. To attain this, incorporated into an automobile is a module configured to disrupt the normal firing of the automobile's spark plugs upon actuation of a user-controlled controller. In an embodiment, the module electrically couples the automobile's coil to the automobile's distributor cap through a controller-controlled switch. In an embodiment, the module relays instruction sets to an engine control unit, upon execution of the instruction set the engine control unit disrupts spark plug firing. A method for preventing automobile theft, which incorporates into an ignition system a user-controlled module.

19 Claims, 2 Drawing Sheets

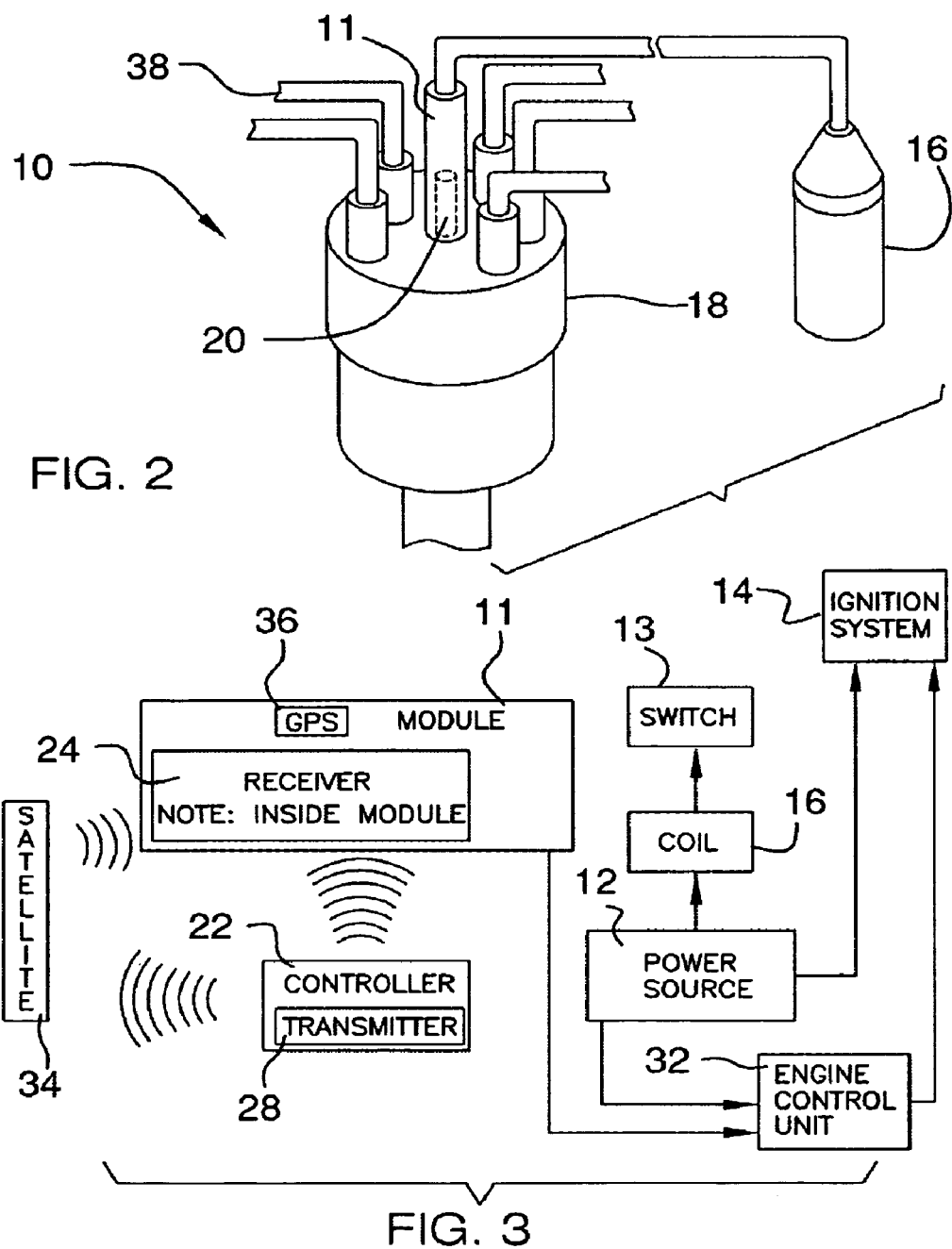

AUTOMOBILE ANTI-THEFT DEVICE

BACKGROUND OF THE INVENTION

1. Field of the Invention

The present invention relates to an anti-theft device for use in connection with automobiles. The automobile anti-theft device has particular utility in connection with remotely disabling vehicles.

2. Description of the Related Art

Automobile anti-theft devices are desirable for preventing the theft of automobiles.

The use of auto anti-theft devices is known in the prior art. For example, U.S. Pat. No. 5,477,090 to Davis discloses an auto anti-theft device that may disable an auto and lock the auto's hood.

U.S. Pat. No. 6,265,787 to Downey discloses an auto anti-theft device that disables an ignition coil by providing a switch between the ignition coil and its power source thus preventing the coil from generating a spark. However, the Downey '787 patent does not disclose an anti-theft apparatus having a module and a controller, where the automobile's coil is electrically coupled to the distributor cap through a switch internal to the module, where the switch is opened or closed via the controller.

Similarly, U.S. Pat. No. 5,793,306 to Veshinin et al. discloses an identification system employing frequency-based coded information that disables a vehicle in the absence of reception of a set of signals transmitted by an associated transmitter, to be worn on the vehicle owner's person. However, the Veshinin et al. '306 patent does not does not disclose an anti-theft apparatus having a module and a controller, where the automobile's coil is electrically coupled to the distributor cap through a switch internal to the module, where the switch is opened or closed via the controller.

U.S. Pat. No. 3,669,211 to Gilgoff discloses a remote control automobile theft prevention mechanism that includes a tamper-proof housing mounted on the distributor of an automobile. However, the Gilgoff '211 patent does not does not disclose an anti-theft apparatus having a module and a controller, where the automobile's coil is electrically coupled to the distributor cap through a switch internal to the module, where the switch is opened or closed via the controller.

U.S. Pat. No. 5,119,065 to Wiehagen discloses a vehicle protection system that includes a lock body carried on the vehicle and having a key receiving a slot thus providing more secure vehicle door locks. However, the Wiehagen '065 patent does not does not disclose an anti-theft apparatus having a module and a controller, where the automobile's coil is electrically coupled to the distributor cap through a switch internal to the module, where the switch is opened or closed via the controller.

Lastly, U.S. Design Pat. No. 270,830 to Jacobs appears to disclose a theft-prevention ignition-disabling unit for vehicles that appears to be manually operated. However, the Jacobs '830 patent does not appear to disclose an anti-theft apparatus having a module and a controller as described in the instant application.

While the above-described devices fulfill their respective, particular objectives and requirements, the aforementioned patents do not describe an automobile anti-theft device that allows the disruption of the firing of spark plugs by switching the connection between the coil and the spark plugs. The '787 patent to Downey makes no provision for switching the connection between the coil and the distributor and thus the spark plugs. Instead Downey '787 switches the connection between the coil and a power supply to the coil.

Therefore, a need exists for a new and improved automobile anti-theft device that can be used for disrupting the firing of spark plugs. In this regard, the present invention substantially fulfills this need. In this respect, the automobile anti-theft device according to the present invention substantially departs from the conventional concepts and designs of the prior art, and in doing so provides an apparatus primarily developed for the purpose of disabling a vehicle by disrupting the firing of spark plugs, where such disablement may be caused remotely.

SUMMARY OF THE INVENTION

In view of the foregoing disadvantages inherent in the known types of switching of the connection between the coil and the distributor now present in the prior art, the present invention provides an improved automobile anti-theft device, and overcomes the above-mentioned disadvantages and drawbacks of the prior art. As such, the general purpose of the present invention, which will be described subsequently in greater detail, is to provide a new and improved automobile anti-theft device and method of preventing automobile theft which has all the advantages of the prior art mentioned heretofore and many novel features that result in a automobile anti-theft device which is not anticipated, rendered obvious, suggested, or even implied by the prior art, either alone or in any combination thereof.

To attain this, the present invention essentially comprises an apparatus including a module and a controller, where the module has a switch that electrically couples an automobile's coil to it's distributor cap and where the switch is actuated by the controller. The invention also includes an embodiment having a module and a controller, where the module provides input to an engine control unit (ECU), where the engine control unit controls the generation of sparks to fire the automobile's spark plugs, and where the controller is configured to provide a signal to the module, which, when relayed to the ECU, disrupts the firing of the engine's pistons. This may be accomplished via disrupting the firing of spark plugs for gasoline engines, or via reduction of the fluid provided to the injectors of a diesel engine.

There has thus been outlined, rather broadly, the more important features of the invention in order that the detailed description thereof that follows may be better understood and in order that the present contribution to the art may be better appreciated.

The invention may also include at least one transmitter and/or at least one receiver. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automobile anti-theft device that has all of the advantages of the prior art auto anti-theft devices and none of the disadvantages.

It is another object of the present invention to provide a new and improved automobile anti-theft device that may be easily and efficiently manufactured and marketed.

An even further object of the present invention is to provide a new and improved automobile anti-theft device that has a low cost of manufacture with regard to both materials and labor, and which accordingly is then susceptible of low prices of sale to the consuming public, thereby making such automobile anti-theft device economically available to the buying public.

Still another object of the present invention is to provide a new automobile anti-theft device that provides in the apparatuses and methods of the prior art some of the advantages thereof, while simultaneously overcoming some of the disadvantages normally associated therewith.

Even still another object of the present invention is to provide an automobile anti-theft device for use by law enforcement. Such an automobile anti-theft device could correlate modules to vehicle identification numbers, or VINs. Consequently, upon notification of theft of a particular automobile having a specific VIN, law enforcement personnel could transmit a signal to the corresponding module thus remotely disabling the stolen automobile. Such disablement may be facilitated via the use of satellite communication with the module. Thus, still yet another object of the present invention is to provide an automobile anti-theft device having satellite control.

Lastly, it is an object of the present invention to provide a new and improved method of preventing automobile theft.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a view of an embodiment of the apparatus of the present invention.

FIG. 3 is a block diagram of an embodiment of the present invention.

The same reference numerals refer to the same parts throughout the various figures.

Figure 1:
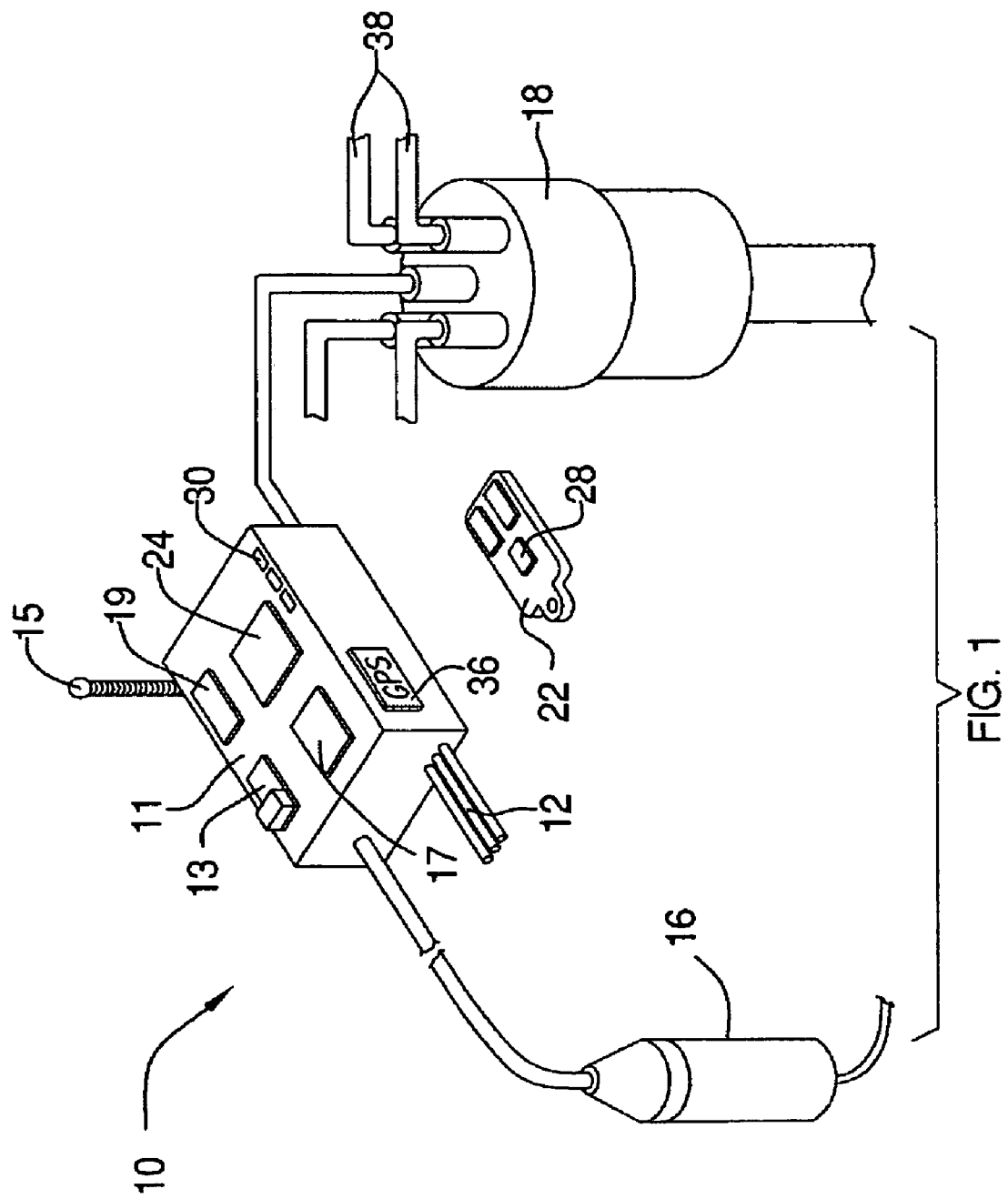
FIG. 1 is an oblique view of an embodiment of the apparatus of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Referring now to the drawings, and particularly to FIGS. 1–3, a preferred embodiment of the automobile anti-theft apparatus of the present invention is shown and generally designated by the reference numeral 10.

In FIG. 1, a new and improved automobile anti-theft device 10 of the present invention is illustrated and will be described. More particularly, the automobile anti-theft device 10 has a module 11, which receives input from a controller 22. Using such input, the module may prevent the proper operation of the automobile. In particular, the module may disrupt the firing of an automobile's pistons, as described below.

As known to one skilled in the art, an automobile's ignition system produces a high-voltage electrical charge and transmits it to spark plugs via ignition wires 38. In a 'classic' ignition system, that is, one that is not electronically controlled, a coil generates the charge and the charge first flows to a distributor cap, which you can easily find under the hood of most 'classic' cars. The distributor cap has one wire going in the center and four, six, or eight wires (depending on the number of cylinders) coming out of it. These ignition wires 38 send the charge to each spark plug. The engine is timed so that, under normal operating conditions, only one cylinder receives a spark from the distributor at a time. Further, the cylinder receives sparks at regular intervals under normal operating conditions. However, in the preferred embodiment shown, the module 11 may disrupt the normal firing of an engine's spark plugs.

As described, an ignition system including a distributor cap 18 must be coupled to a coil 16, where the coil provides the necessary electric potential to fire the spark plugs. However, in order to fire the spark plugs, the electric potential, or charge, must reach the distributor. In the preferred embodiment shown, module 11 is arranged between the coil 16 and the distributor cap 18. The coil 16 is electrically coupled to the distributor cap 18 through a switch internal to the module 11. Such a switch may be, for example, a relay. Thus, the switch 13 must be closed for the distributor cap 18 to receive the coil's charge. Thus, by opening the switch 13, all spark plug firing will cease, thus preventing the automobile's engine from operating. Forcing an automobile's engine to cease running in such a fashion may be undesirable if the automobile is in motion, as all power systems in the automobile may also cease. This may be particularly dangerous at high speeds. For example, the power steering and brakes may cease functioning, causing a potential liability concern as the automobile may not safely come to a stop. Therefore, in an embodiment, the power to each spark plug could be selectively controlled, allowing the spark plugs to a particular piston to be deactivated, thereby stopping the pistons one at a time. In this manner, the car can be brought to a gradual stop by external control of its maximum speed via selective deactivation of the pistons without cutting power completely, thus leaving the driver in control of braking and steering, yet not speed. Alternatively, the switch may be configured to pulse rather than completely open. In this fashion, the coil's charge could be provided to the distributor in an intermittent fashion. As such, normal spark plug firing would be prevented, and the car could be forced to operate at very slow speeds. In an alternate embodiment, an automobile could be configured such that the power systems required to safely bring the automobile to a stop would receive power from a back up source when the switch is opened. In an embodiment, the switch may be configured to pulse if the automobile is in motion, and to open if the automobile is at rest.

Such a back up source could be the automobile's battery, or power source 12. In an embodiment, the back up source could be an auxiliary motor. Module 11 is also powered from power source 12, which is the automobile's battery in the preferred embodiment. However, in an embodiment, module 11 may have its own internal battery supply. Further, module 11 may be configured such that, absent a power source, the switch remains open and the automobile remains inoperable.

Module 11 may incorporate a microprocessor 17. Module 11 may also include a receiver 24. Such a receiver may be adapted to receive input from a controller 22. For example, the receiver 24 may receive a signal from the remote controller 22 instructing the switch 13 to open. However, in an alternate embodiment, the receiver 24 may receive a signal from within the automobile via a push-button switch. For example, it may be desirable to install within the trunk of the automobile a "panic switch" which may be actuated in the event that the automobile's owner is placed in the trunk by a criminal. Such a panic switch would allow the owner to prevent the operation of the vehicle, thus preventing a criminal from removing the owner from the immediate premises. In an embodiment, the module may also incorporate a module transmitter 19. Such transmitter may be configured to generate a panic signal in the event of the actuation of the panic switch. Such a panic signal may be relayed via satellite.

In the preferred embodiment shown, the controller 22 is a hand-held device, not unlike key fobs that operate vehicle door locks and alarms. However, it is to be stressed that the controller is not necessarily intended to be a key fob, particularly as the keys may be stolen with the auto mobile. Typically, the controller is to be carried by the owner, preferably in a manner that would reduce its incident of theft. As an example, the owner could wear the controller on a chain about the neck. As another example, the owner could carry the controller in a pocket. As yet another example, the owner could incorporate a controller into a shoe heel. Controller 22 may include a transmitter 28. Although controller 22 is shown as a hand-held device, controller 22 may also incorporate a satellite system for the transmission of signals to the module.

In the embodiment in which the controller 22 includes a satellite system, the module may comprise a global positioning system or GPS 36. The GPS will allow the location of the automobile to be known such that the receiver 24 may receive a signal from the controller 22 regardless of the distance between the two. Further, such an anti-theft device would enable law enforcement to both locate and disable stolen vehicles. Each module and its associated GPS would have a one-to-one correlation with a vehicle identification number, or VIN.

The module may be of any size to accommodate it's necessary components. Further, the module may be constructed of any suitably sturdy material. In the preferred embodiment, the module is metal. The module may comprise an external antenna 15. Further, the module may comprise status indicators 30. In a preferred embodiment, the status indicators may be LEDs. Such LEDs may be configured to indicate whether the module is in various states, such as, for example "run" or "stop".

Turning to FIG. 2, an alternate embodiment of the invention is shown. In this view, we see a module 11 similar to that illustrated in FIG. 1. In this case, the module 11 is directly in the line coupling the coil 16 with the distributor cap 18. Within the module 11, is a switch 20. Upon actuation of the controller, the switch 20 will open, thus preventing charge from the coil from reaching the distributor cap and thus the spark plugs.

Although the invention has been described in detail for use with a classic ignition system, it may also be configured for use with a solid state, or distributorless, ignition system as well. Such a distributorless ignition system may also be referred to as an electronic ignition system. Automobiles having electronic ignition systems also have engine control units, or ECUs. Instead of one main coil, distributorless ignitions have a coil for each spark plug, located directly on the spark plug itself. The coil in this type of system works the same way as the larger, centrally located coils. However, in an embodiment of this type of system, the engine control unit controls the transistors that break the groundside of the circuit, which generates the spark. This gives the ECU total control over spark timing. Systems like these have some substantial advantages. First, there is no distributor, which is an item that eventually wears out. Also, there are no high-voltage spark-plug wires, which also wear out. And finally, they can improve efficiency, emissions and increase the overall power of a car merely because they allow for more precise control of the spark timing.

In an automobile having an electronic ignition system, the module is configured to provide input to the engine control unit. Such input could either instruct the engine control unit to completely cease spark plug firing, or the input could instruct the engine control unit to disrupt the spark plug firing such that operation of the automobile would be significantly detrimentally affected. That is, it would be desirable to disrupt the spark plug firing such that the automobile would be substantially inoperable. However, it may be desirable to allow some of the automobile's systems to operate such that a moving automobile could be safely stopped.

Turning to FIG. 3, a block diagram of a preferred embodiment of an anti-theft device used with a distributorless ignition system is shown. Module 11 is shown having an internal receiver and global positioning system or GPS. Module 11 receives power from power source 12. Module 11 also receives input from controller 22. Input from controller 22 is relayed to the engine control unit, or ECU, 32. The engine control unit analyzes the input from the controller 22, and uses this input in providing subsequent instructions to the ignition system 14. Controller 22 may send input directly to the receiver 24. However, the receiver may be out of the transmitter's range. In this case, the controller 22 may initiate a signal to be sent to a satellite system 34. Satellite system 34 can in turn send a signal to the receiver 24, as the location of the module 11 would be made known via the global positioning system 36.

In use, it can now be understood that the automobile anti-theft device could be installed in an automobile either as a retrofit or in a new automobile. As a retrofit, the device would disrupt the connection between the automobile's coil 16 and it's distributor cap 18. In a new automobile, the device would disrupt the firing of spark plugs by providing input to the engine control unit 32 that controls spark plug firing. The automobile's owner would initiate either disruption. The automobile owner could have a hand-held remote controller that could signal a module within the automobile to initiate an action to disrupt spark plug firing. The device could also include a GPS, or global positioning system. A global positioning system could enable the device to be operable in those cases that the module is out of the range of a hand-held remote. Such a GPS would work in conjunction with a satellite system, and would enable law enforcement to both disable a stolen automobile as well as locate it.

While a preferred embodiment of the automobile anti-theft device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitably sturdy material such as hard plastic or composite may be used instead of the metal module described. Also, the device may be wired such that status indicators may be viewable from the automobile's dashboard. And although deterring or preventing theft have been described, it should be appreciated that the automobile anti-theft device herein described is also suitable for providing speed control to an automobile. For example, the controller may be coupled to the automobile's speedometer. Upon reaching or exceeding a user-defined maximum speed, the controller could provide input to the module to disrupt the firing of the automobile's spark plugs. Such speed control would be desirable by parents or car rental companies. Furthermore, a wide variety of switching mechanisms may be used instead of the relay described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An anti-theft apparatus for use with an automobile having an ignition system, said apparatus comprising:
    a module, wherein the module receives power from an electrical power source connected with an automobile's ignition system, wherein the ignition system comprises a coil and a distributor cap, wherein the coil is electrically coupled to the distributor cap via a switch internal to the module, and wherein the module further comprises a microprocessor, wherein the microprocessor is configured to pulse the switch on and off; and
    a controller, wherein the controller is configured to initiate actuation of the switch.

2. The apparatus as recited in claim 1, wherein the module further comprises a receiver, wherein the receiver is configured to receive an electronic signal.

3. The apparatus as recited in claim 2, wherein the controller comprises a transmitter, wherein the controller is configured to transmit an electronic signal to the receiver.

4. The apparatus as recited in claim 3, wherein the controller comprises a portable remote.

5. The apparatus as recited in claim 4, wherein the portable remote is incorporated into a shoe heel.

6. An anti-theft apparatus for use with an automobile having an electronic ignition system, said apparatus comprising:
    a module, wherein the module is adapted to be installed to an automobile, wherein the automobile comprises an engine control unit and an ignition system, wherein the module receives power from an electrical power source connected to the automobile's ignition system, wherein the ignition system comprises spark plugs, a coil, and a distributor cap, wherein the engine control unit controls the generation of sparks which fire the spark plugs, wherein the module is configured to provide input to the engine control unit, wherein the coil is electrically coupled to the distributor cap via a switch internal to the module, and wherein the module further comprises a microprocessor, wherein the microprocessor is configured to pulse the switch on and off; and
    a controller, wherein the controller is configured to provide an electronic signal to the module, wherein the module relays the electronic signal to the engine control unit, and wherein the electronic signal instructs the engine control unit to disrupt generation of sparks which fire the spark plugs.

7. The apparatus as recited in claim 6, wherein the module further comprises a receiver, and wherein the controller further comprises a transmitter.

8. The apparatus as recited in claim 6, wherein the apparatus further comprises a trunk-mounted switch, wherein the trunk-mounted switch is configured to provide an electronic panic-signal to the module.

9. The apparatus as recited in claim 6, wherein the module is configured to receive satellite-generated signals.

10. The apparatus as recited in claim 9, wherein the module further comprises a Global Positioning System.

11. The apparatus as recited in claim 10, wherein the Global Positioning System corresponds to a unique vehicle identification number (VIN) number.

12. The apparatus as recited in claim 6, wherein the module relays the electronic signal to the engine control unit, and wherein the electronic signal instructs the engine control unit to cease generation of sparks which fire at least one of the spark plugs.

13. A method of preventing automobile theft, said method comprising:
    incorporating a module into an automobile's ignition system, wherein the ignition system comprises a coil and a distributor cap, wherein the coil is electrically coupled to the distributor cap via a switch internal to the module, wherein the module is configured to disrupt faring of the automobile's pistons, wherein the module further comprises a microprocessor, wherein the microprocessor is configured to pulse the switch on and off; and
    coupling the module with a controller, wherein the controller is configured to provide input to the module, and wherein the controller provides input to the module when the automobile is stolen.

14. The method as recited in claim 13, wherein the module is configured to disrupt firing of the automobile's pistons by disconnecting the automobile's coil from the automobile's distributor cap.

15. The method as recited in claim 13, wherein the module is configured to disrupt firing of the automobile's pistons by providing an instruction set to the automobile's engine control unit, wherein the automobile's engine control unit disrupts generation of sparks which fire the automobile's spark plugs upon the execution of the instruction set.

16. The method as recited in claim 13, wherein the automobile's engine is a diesel engine, and wherein the module is configured to disrupt firing of the automobile's pistons by providing an instruction set to the automobile's engine control unit, wherein the automobile's engine control unit reduces the fluid provided to the injectors upon the execution of the instruction set.

17. The method as recited in claim 13, wherein incorporating a module further comprises incorporating a receiver.

18. The method as recited in claim 17, wherein coupling the module to the controller further comprises incorporating a transmitter into the controller.

19. The method as recited in claim 18, further comprising correlating the automobile's unique vehicle identification number with the automobile's module, wherein incorporating a module further comprises incorporating a global positioning system (GPS), and wherein coupling the module to the controller further comprises providing input to the module via a satellite.

* * * * *